United States Patent
Hanagandi et al.

(10) Patent No.: US 11,669,733 B2
(45) Date of Patent: Jun. 6, 2023

(54) PROCESSING UNIT AND METHOD FOR COMPUTING A CONVOLUTION USING A HARDWARE-IMPLEMENTED SPIRAL ALGORITHM

(71) Applicant: Marvell Asia Pte, Ltd., Singapore (SG)

(72) Inventors: Deepak I. Hanagandi, Bangalore (IN); Venkatraghavan Bringivijayaraghavan, Cheyyar (IN); Aravindan J. Busi, Bangalore (IN)

(73) Assignee: Marvell Asia Pte. Ltd., Singapore (SG)

( * ) Notice: Subject to any disclaimer, the term of this patent is extended or adjusted under 35 U.S.C. 154(b) by 625 days.

(21) Appl. No.: 16/724,554

(22) Filed: Dec. 23, 2019

(65) Prior Publication Data

US 2021/0192336 A1    Jun. 24, 2021

(51) Int. Cl.
| | | |
|---|---|---|
| G06N 3/08 | (2006.01) | |
| G06N 3/04 | (2023.01) | |
| G06F 17/16 | (2006.01) | |
| G06F 9/54 | (2006.01) | |
| G06F 17/15 | (2006.01) | |

(52) U.S. Cl.
CPC .............. *G06N 3/08* (2013.01); *G06F 9/544* (2013.01); *G06F 9/545* (2013.01); *G06F 17/153* (2013.01); *G06F 17/16* (2013.01); *G06N 3/04* (2013.01)

(58) Field of Classification Search
CPC .......... G06N 3/08; G06N 3/04; G06N 3/0454; G06F 9/544; G06F 9/545; G06F 17/153; G06F 17/16
See application file for complete search history.

(56) References Cited

U.S. PATENT DOCUMENTS

| | | | |
|---|---|---|---|
| 5,471,627 A | 11/1995 | Means et al. | |
| 9,697,463 B2 | 7/2017 | Ross et al. | |
| 9,805,303 B2 | 10/2017 | Ross et al. | |
| 9,805,304 B2 | 10/2017 | Ross | |
| 2016/0342893 A1* | 11/2016 | Ross | G06N 5/04 |
| 2019/0102653 A1* | 4/2019 | Agarwal | G06T 7/45 |

(Continued)

OTHER PUBLICATIONS

T. Ray, "Intel Can Beat Nvidia in 'Inference' of A.I., Says Morningstar", Tech Trader Daily, 2017, pp. 1-3, https://www.barrons.com/articles/intel-can-beat-nvidia-in-inference-of-a-i-says-morningstar-1504298887.

(Continued)

*Primary Examiner* — Farley Abad

(57) ABSTRACT

Disclosed is a processing unit for computing a convolution of an activations matrix (e.g., a N×N activations matrix) and a weights kernel (e.g., a M×M weights kernel). The processing unit specifically employs an array of processing elements and a hardware-implemented spiral algorithm to compute the convolution. Due to this spiral algorithm, the need for a discrete data setup logic block is avoided, activation values from the activations matrix can be preloaded into processing elements only one time so that the need to repeatedly access the activations matrix is avoided, and the computation can be completed in a relatively low number of clock cycles, which is independent of the number of activation values in the activation matrix and which is equal to the number of weight values in a weights kernel. Also disclosed is an associated processing method.

17 Claims, 17 Drawing Sheets

(56) References Cited

U.S. PATENT DOCUMENTS

2019/0279353 A1* 9/2019 Kowald .............. G06V 20/182

OTHER PUBLICATIONS

Sato et al., "An In-Depth Look at Google's First Tensor Processing Unit (TPU)", AI & Machine Learning, 2017, pp. 1-17, https://cloud.google.com/blog/products/gcp/an-in-depth-look-at-googles-first-tensor-processingunit-tpu.
Biswas et al., "Conv-RAM: An Energy-Efficient SRAM with Embedded Convolution Computation for Low-Power CNN-Based Machine Learning Application", IEEE International Solid-State Circuits Conference, 2018, pp. 488-490.
Martinez et al., "High Performance Embedded Computing Handbook: A Systems Perspective", Massachusetts Institute of Technology, CRC Press, 2008, p. 248.
Pavel et al., "Algorithms for Efficient Computation of Convolution", Design and Architectures for Digital Signal Processing, Intech, 2013, pp. 179-208.

* cited by examiner

400

*NxN* Activations Matrix  (*e.g., N=4*)

| A1 | A2 | A3 | A4 |
|----|----|----|----|
| B1 | B2 | B3 | B4 |
| C1 | C2 | C3 | C4 |
| D1 | D2 | D3 | D4 |

500

*MxM* Weights Kernel   (*e.g., M=3*)

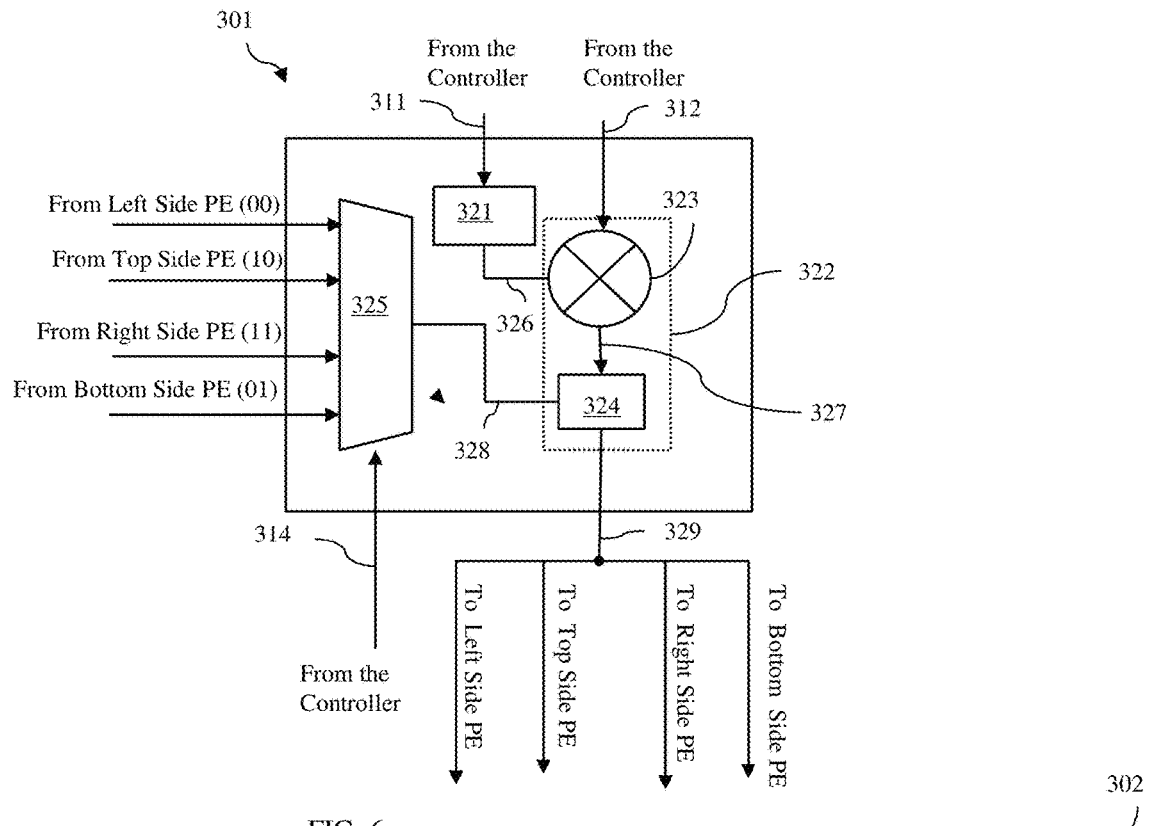
FIG. 6
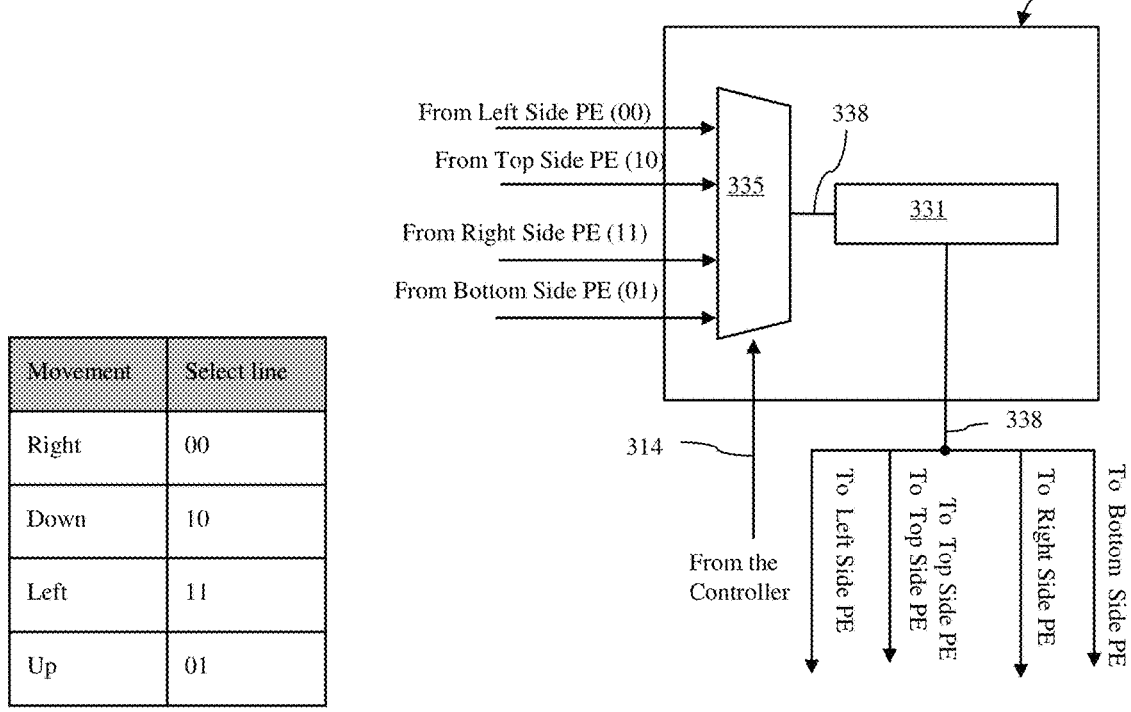
| Movement | Select line |
|---|---|
| Right | 00 |
| Down | 10 |
| Left | 11 |
| Up | 01 |
FIG. 8
FIG. 7

Clock Cycle #1

| a1 | a2 | a3 |
|----|----|----|
| b1 | b2 | b3 |
| c1 | c2 | c3 |

390

399

| 0 | 0 | 0 | 0 | 0 | 0 | 0 | 0 |
|---|---|---|---|---|---|---|---|
|   |   | (A1*a1)+ | (A2*a1)+ | (A3*a1)+ | (A4*a1)+ |   |   |
| 0 | 0 | 0 | 0 | 0 | 0 | 0 | 0 |
|   |   | (B1*a1)+ | (B2*a1)+ | (B3*a1)+ | (B4*a1)+ |   |   |
| 0 | 0 | 0 | 0 | 0 | 0 | 0 | 0 |
|   |   | (C1*a1)+ | (C2*a1)+ | (C3*a1)+ | (C4*a1)+ |   |   |
| 0 | 0 | 0 | 0 | 0 | 0 | 0 | 0 |
|   |   | (D1*a1)+ | (D2*a1)+ | (D3*a1)+ | (D4*a1)+ |   |   |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 9

Clock Cycle #3

| | 00 → | | 314 |
|---|---|---|---|
| a1 | a2 | a3 | |
| b1 | b2 | b3 | |
| c1 | c2 | c3 | |

390

399

| 0 | 0 | 0 | 0 | 0 | 0 | 0 | 0 |
|---|---|---|---|---|---|---|---|
| 0 | 0 | 0 | (A*a2) | (A1*a3)+<br>(A2*a2)+(<br>A1*a1) | (A2*a3)+<br>(A3*a2)+(<br>A2*a1) | (A3*a3)+<br>(A4*a2)+(<br>A3*a1) | (A4*a3)+<br>(A4*a1) |
| 0 | 0 | 0 | (B1*a2) | (B1*a3)+<br>(B2*a2)+(<br>B1*a1) | (B2*a3)+<br>(B3*a2)+<br>(B2*a1) | (B3*a3)+<br>(B4*a2)+(<br>B3*a1) | (B4*a3)+<br>(B4*a1) |
| 0 | 0 | 0 | (C1*a2) | (C1*a3)+<br>(C2*a2)+(<br>C1*a1) | (C2*a3)+<br>(C3*a2)+<br>(C2*a1) | (C3*a3)+<br>(C4*a2)+(<br>C3*a1) | (C4*a3)+<br>(C4*a1) |
| 0 | 0 | 0 | (D1*a2) | (D *a3)+<br>(D2*a2)+(<br>D1*a1) | (D *a3)+<br>(D3*a2)+<br>(D2*a1) | (D3*a3)+<br>(D4*a2)+(<br>D3*a1) | (D4*a3)+<br>(D4*a1) |
| 0 | 0 | 0 | 0 | 0 | 0 | 0 | 0 |
| 0 | 0 | 0 | 0 | 0 | 0 | 0 | 0 |

FIG. 11

Clock Cycle #4

| a1 | a2 | a3 |
|----|----|----|
| b1 | b2 | b3 |
| c1 | c2 | c3 |

↓ 10  — 314

390 ↘

399

| 0 | 0 | 0 | 0 | 0 | 0 | 0 | 0 |
|---|---|---|---|---|---|---|---|
| 0 | 0 | (A1*b3)+ 0 | (A2*b3)+ 0 | (A3*b3)+ 0 | (A4*b3)+ 0 | 0 | 0 |
| 0 | 0 | (B1*b3)+ (A1*a3) | (B2*b3)+ (A2*a3)+ (A1*a2) | (B3*b3)+ (A3*a3)+(A2*a2)+(A1*a1) | (B4*b3)+ (A4*a3)+(A3*a2)+(A2*a1) | (A4*a2)+(A3*a1) | (A4*a1) |
| 0 | 0 | (C1*b3)+ (B1*a3) | (C2*b3)+ (B2*a3)+ (B1*a2) | (C3*b3)+ (B3*a3)+(B2*a2)+(B1*a1) | (C4*b3)+ ((B4*a3)+(B3*a2)+(B2*a1) | (B4*a2)+(B3*a1) | (B4*a1) |
| 0 | 0 | (D1*b3)+ (C1*a3) | (D2*b3)+ (C2*a3)+ (C1*a2) | (D3*b3)+ (C3*a3)+(C2*a2)+(C1*a1) | (D4*b3)+ (C4*a3)+(C3*a2)+(C2*a1) | (C4*a2)+(C3*a1) | (C4*a1) |
| 0 | 0 | (D1*a3) | (D2*a3)+ (D1*a2) | (D3*a3)+(D2*a2)+(D1*a1) | (D4*a3)+(D3*a2)+(D2*a1) | (D4*a2)+(D3*a1) | (D4*a1) |
| 0 | 0 | 0 | 0 | 0 | 0 | 0 | 0 |

FIG. 12

Clock Cycle #5

| a1 | a2 | a3 |
|----|----|----|
| b1 | b2 | b3 |
| c1 | c2 | c3 |

↓ 10, 314

390, 399

| 0 | 0 | 0 | 0 | 0 | 0 | 0 | 0 |
|---|---|---|---|---|---|---|---|
| 0 | 0 | (A1*c3)<br>+<br>0 | (A2*c3)<br>+<br>0 | (A3*c3)<br>+<br>0 | (A4*c3)<br>+<br>0 | 0 | 0 |
| 0 | 0 | (B1*c3)<br>+<br>(A1*b3) | (B2*c3)<br>+<br>(A2*b3) | (B3*c3)<br>+<br>(A3*b3) | (B4*c3)<br>+<br>(A4*b3) | 0 | 0 |
| 0 | 0 | (C1*c3)<br>+<br>(B1*b3)+<br>(A1*a3) | (C2*c3)<br>+<br>(B2*b3)+<br>(A2*a3)+<br>(A1*a2) | (C3*c3)<br>+<br>(B3*b3)+<br>(A3*a3)+<br>(A2*a2)+<br>(A1*a1) | (C4*c3)<br>+<br>(B4*b3)+<br>(A4*a3)+<br>(A3*a2)+<br>(A2*a1) | (A4*a2)+(<br>A3*a1) | (A4*a1) |
| 0 | 0 | (D1*c3)<br>+<br>(C1*b3)+<br>(B1*a3) | (D2*c3)<br>+<br>(C2*b3)+<br>(B2*a3)+<br>(B1*a2) | (D3*c3)<br>+<br>(C3*b3)+<br>(B3*a3)+<br>(B2*a2)+<br>B1*a1) | (D4*c3)<br>+<br>(C4*b3)+<br>(B4*a3)+<br>(B3*a2)+<br>B2*a1) | (B4*a2)+(<br>B3*a1) | (B4*a1) |
| 0 | 0 | (D1*b3)+<br>(C1*a3) | (D2*b3)+<br>(C2*a3)+<br>(C1*a2) | (D3*b3)+<br>(C3*a3)+<br>C2*a2)+<br>C1*a1) | (D4*b3)+<br>(C4*a3)+<br>(C3*a2)+<br>C2*a1) | (C4*a2)+(<br>C3*a1) | (C4*a1) |
| 0 | 0 | (D1 *a3) | (D2 *a3)+<br>(D1*a2) | (D3*a3)+<br>D2*a2)+<br>D1*a1) | (D4*a3)+<br>D3*a2)+<br>D2*a1) | (D4*a2)+(<br>D3*a1) | (D4*a1) |

FIG. 13

Clock Cycle #6

| a1 | a2 | a3 |
|---|---|---|
| b1 | b2 | b3 |
| c1 | c2 | c3 |

← 314
11

390
399

| | | | | | | | |
|---|---|---|---|---|---|---|---|
| 0 | 0 | 0 | 0 | 0 | 0 | 0 | 0 |
| 0 | (A1*c3) | (A2*c2)+<br>(A2*c3) | (A3*c2)+<br>(A3*c3) | (A4*c2)+<br>(A4*c3) | 0 | 0 | 0 |
| | | **(A1*c2)+** | | | | | |
| 0 | (B1*c3)+<br>(A1*b3) | (B2*c2)+<br>(B2*c3)+<br>(A2*b3) | (B3*c2)+<br>(B3*c3)+<br>(A3*b3) | (B4*c2)+<br>(B4*c3)+<br>(A4*b3) | 0 | 0 | 0 |
| | | **(B1*c2)+** | | | | | |
| 0 | (C1*c3)+<br>(B1*b3)+<br>(A1*a3) | (C2*c2)+<br>(C2*c3)+<br>(B2*b3)+<br>(A2*a3)+<br>(A1*a2) | (C3*c2)+<br>(C3*c3)+<br>(B3*b3)+<br>(A3*a3)+<br>(A2*a2)+<br>(A1*a1) | (C4*c2)+<br>(C4*c3)+<br>(B4*b3)+<br>(A4*a3)+<br>(A3*a2)+<br>(A2*a1) | (A4*a2)+(<br>A3*a1) | (A4*a1) | 0 |
| | | **(C1*c2)+** | | | | | |
| 0 | (D1*c3)+<br>(C1*b3)+<br>(B1*a3) | (D2*c2)+<br>(D2*c3)+<br>(C2*b3)+<br>(B2*a3)+<br>(B1*a2) | (D3*c2)+<br>(D3*c3)+<br>(C3*b3)+<br>(B3*a3)+<br>(B2*a2)+<br>(B1*a1) | (D4*c2)+<br>(D4*c3)+<br>(C4*b3)+<br>(B4*a3)+<br>(B3*a2)+<br>(B2*a1) | (B4*a2)+(<br>B3*a1) | (B4*a1) | 0 |
| | | **(D1*c2)+** | | | | | |
| 0 | (D1*b3)+<br>(C1*a3) | (D2*b3)+<br>(C2*a3)+<br>(C1*a2) | (D3*b3)+<br>(C3*a3)+<br>(C2*a2)+<br>(C1*a1) | (D4*b3)+<br>(C4*a3)+<br>(C3*a2)+<br>(C2*a1) | (C4*a2)+(<br>C3*a1) | (C4*a1) | 0 |
| 0 | (D1*a3) | (D2*a3)+<br>(D1*a2) | (D3*a3)+(<br>D2*a2)+(<br>D1*a1) | (D4*a3)+(<br>D3*a2)+(<br>D2*a1) | (D4*a2)+(<br>D3*a1) | (D4*a1) | 0 |

FIG. 14

Clock Cycle #7

| a1 | a2 | a3 |
|---|---|---|
| b1 | b2 | b3 |
| c1 | c2 | c3 |

314 ← 11

390

399

| 0 | 0 | 0 | 0 | 0 | 0 | 0 | 0 |
|---|---|---|---|---|---|---|---|
| (A1*c3) | (A1*c2)+ (A2*c3) | (A1*c1)+ (A2*c2)+ (A3*c3) | (A2*c1)+ (A3*c2)+ (A4*c3) | (A3*c1)+ (A4*c2) | (A4*c1)+ 0 | 0 | 0 |
| (B1*c3)+ (A1*b3) | (B *c2)+ (B2*c3)+ (A2*b3) | (B1*c1)+ (B2*c2)+ (B3*c3)+ A3*b3) | (B2*c1)+ (B3*c2)+ (B4*c3)+ (A4*b3) | (B3*c1)+ (B4*c2) | (B4*c1)+ 0 | 0 | 0 |
| (C1*c3)+ (B1*b3)+ (A1*a3) | (C1*c2)+ (C2*c3)+ (B2*b3)+ (A2*a3)+ (A1*a2) | (C1*c1)+ (C2*c2)+ (C3*c3)+ (B3*b3)+ (A3*a3)+ A2*a2)+ A1*a1) | (C2*c1)+ (C3*c2)+ (C4*c3)+ (B4*b3)+ (A4*a3)+ A3*a2)+ A2*a1) | (C3*c1)+ (C4*c2)+ (A4*a2)+( A3*a1) | (C4*c1)+ (A4*a1) | 0 | 0 |
| (D1*c3)+ (C1*b3)+ (B1*a3) | (D1*c2)+ (D2*c3)+ (C2*b3)+ (B2*a3)+ (B1*a2) | (D1*c1)+ (D2*c2)+ (D3*c3)+ (C3*b3)+ (B3*a3)+ B2*a2)+ B1*a1) | (D2*c1)+ (D3*c2)+ (D4*c3)+ (C4*b3)+ ((B4*a3)+ (B3*a2)+ B2*a1) | (D3*c1)+ (D4*c2)+ (B4*a2)+( B3*a1) | (D4*c1)+ (B4*a1) | 0 | 0 |
| (D *b3)+ (C1*a3) | (D2*b3)+ (C2*a3)+ (C1*a2) | (D3*b3)+ (C3*a3)+ C2*a2)+ C1*a1) | (D4*b3)+ (C4*a3)+ C3*a2)+ C2*a1) | (C4*a2)+( C3*a1) | (C4*a1) | 0 | 0 |
| (D1*a3) | (D2*a3)+ (D1*a2) | (D3*a3)+ D2*a2)+ D1*a1) | (D4*a3)+ D3*a2)+ D2*a1) | (D4*a2)+( D3*a1) | (D4*a1) | 0 | 0 |

FIG. 15

Clock Cycle #9   314 — 01 ↑

| a1 | a2 | a3 |
|---|---|---|
| b1 | b2 | b3 |
| c1 | c2 | c3 |

390 ↙   399

| | | | | | | | |
|---|---|---|---|---|---|---|---|
| (A1*c3) | (A1*c2)+ (A2*c3) | (A1*c1)+ (A2*c2)+ (A3*c3) | (A2*c1)+ (A3*c2)+ (A4*c3) | (A3*c1)+ (A4*c2) | (A4*c1) | 0 | 0 |
| (B1*c3)+ (A1*b3) | (B1*c2)+ (B2*c3)+ (A2*b3) | **(A1*b1) + (B1*c1)+ (B2*c2)+ (B3*c3)+( A3*b3)** | **(A2*b1) + (B2*c1)+ (B3*c2)+ (B4*c3)+ (A4*b3)** | **(A3*b1) + (B3*c1)+ (B4*c2)** | **(A4*b1) + (B4*c1)** | 0 | 0 |
| (C1*c3)+ (B1*b3)+ (A1*a3) | (C1*c2)+ (C2*c3)+ (B2*b3)+ (A2*a3)+ (A1*a2) | **(B1*b1) + (C1*c1)+ (C2*c2)+ (C3*c3)+ (B3*b3)+ (A3*a3)+ A2*a2)+ A1*a1)** | **(B2*b1) + (C2*c1)+ (C3*c2)+ (C4*c3)+ (B4*b3)+ (A4*a3)+( A3*a2)+ A2*a1)** | **(B3*b1) + (C3*c1)+ (C4*c2)+( A4*a2)+( A3*a1)** | **(B4*b1) + (C4*c1)+( A4*a1)** | 0 | 0 |
| (D1*c3)+ (C1*b3)+ (B1*a3) | (D1*c2)+ (D2*c3)+ (C2*b3)+ (B2*a3)+ (B1*a2) | **(C1*b1) + (D1*c1)+ (D2*c2)+ (D3*c3)+ (C3*b3)+ (B3*a3)+ B2*a2)+ B1*a1)** | **(C2*b1) + (D2*c1)+ (D3*c2)+ (D4*c3)+ (C4*b3)+ (B4*a3)+( B3*a2)+ B2*a1)** | **(C3*b1) + (D3*c1)+ (D4*c2)+ (B4*a2)+ B3*a1)** | **(C4*b1) + (D4*c1)+ (B4*a1)** | 0 | 0 |
| (D1*b3)+ (C1*a3) | (D2*b3)+ (C2*a3)+ (C1*a2) | **(D1*b1) + (D3*b3)+ (C3*a3)+( C2*a2)+( C1*a1)** | **(D2*b1) + (D4*b3)+ (C4*a3)+( C3*a2)+( C2*a1)** | **(D3*b1) + (C4*a2)+ C3*a1)** | **(D4*b1) + (C4*a1)** | 0 | 0 |
| (D1*a3) | (D2*a3)+ (D1*a2) | (D3*a3)+( D2*a2)+( D1*a1) | (D4*a3)+( D3*a2)+( D2*a1) | (D4*a2)+( D3*a1) | (D4*a1) | 0 | 0 |
| 0 | 0 | 0 | 0 | 0 | 0 | 0 | 0 |

<u>NxN Activations Matrix</u> *(e.g., N=25)*

| A1 | A2 | A3 | A4 | ... | A25 |
|---|---|---|---|---|---|
| B1 | B2 | B3 | B4 | ... | B25 |
| C1 | C2 | C3 | C4 | ... | C25 |
| D1 | D2 | D3 | D4 | ... | D25 |
| . . . | . . . | . . . | . . . | ... | . . . |
| Y1 | Y2 | Y3 | Y4 | ... | Y25 |

FIG. 18

PROCESSING UNIT AND METHOD FOR COMPUTING A CONVOLUTION USING A HARDWARE-IMPLEMENTED SPIRAL ALGORITHM

BACKGROUND

Field of the Invention

The present invention relates to computing a convolution between an activations matrix and a filter matrix and, more particularly, to a processing unit and a method for computing the convolution.

Description of Related Art

Processing units typically requires multiple processing elements (PE) (e.g., arithmetic logic units (ALUs) such as multiply-accumulate processing elements) to complete an operation and, particularly, to compute a convolution. When computing a convolution, each PE in a processing unit processes data inputs received from a memory and stores data outputs back in the memory. However, using discrete memories for each PE is costly in terms of both chip area consumption and energy consumption, particularly when an operation requires processing by a significant number of PEs to complete. Applications, which employ processing units that require a significant number of PEs to complete compute the convolution, include, but are not limited to, image processing applications, artificial intelligence (AI) and machine learning (ML) applications (e.g., tensor processing (TP) applications), digital signal processing (DSP) applications, advanced driver assist system (ADAS) applications, neural network (NN) and deep learning (DL) applications, fast Fourier transforms (FFTs), and digital filtering applications (e.g., finite impulse response (FIR) and infinite impulse response (IIR)).

In order to save area and energy, processing units that incorporate systolic arrays (also referred to as systolic processors) to compute a convolution have been developed. In a processing unit with a systolic array, a pipeline of PEs is used. A first PE receives a series of first data inputs accessed from a memory, processes the first data inputs and forwards a series of first data outputs to the next PE in the pipeline. The next PE in the pipeline receives the series of first data outputs from the first PE, processes them and forwards a series of second data outputs to the next PE in the pipeline; and so on until the last PE in the pipeline outputs a series of final data outputs for storage back in the memory. However, to ensure that the first data inputs received by the first PE are in the proper order for processing, prior art processing units that incorporate a systolic array to compute a convolution also incorporate a data setup logic block in line between the memory and the first PE in the pipeline. The data setup logic block reads data from the memory, reorganizes that data according to a data setup matrix and feeds the correct series of first data inputs into the first PE. Unfortunately, the discrete data setup logic block can also be costly in terms of chip area consumption and energy consumption.

SUMMARY

Disclosed herein are embodiments of a processing unit configured to compute a convolution of an activations matrix (e.g., a N×N activations matrix, also referred to herein as an inputs matrix) and a weights kernel (e.g., a M×M weights kernel, also referred to herein as a convolution filter matrix). The processing unit specifically employs an array of processing elements and a hardware-implemented spiral algorithm to compute the convolution. Due to this spiral algorithm, the need for a discrete data setup logic block is avoided, activation values from the activations matrix can be pre-loaded into processing elements only one time so that the need to repeatedly access the activations matrix is avoided, and the computation can be completed in a relatively low number of clock cycles, which is independent of the number of activation values in the activation matrix and which is equal to the number of weight values in a weights kernel. That is, a convolution computation using a M×M weights kernel can be completed in $M^2$ clock cycles. Also disclosed herein are embodiments of an associated processing method.

More particularly, disclosed herein are embodiments of a processing unit that is configured to compute a convolution of an activations matrix (e.g., a N×N activations matrix, also referred to herein as an inputs matrix) and a weights kernel (e.g., a M×M weights kernel, also referred to herein as a convolution filter matrix). The processing unit can include an array of processing elements and, within the array, a sub-array of primary processing elements corresponding to the activations matrix (e.g., a N×N sub-array of primary processing elements for a N×N activations matrix) and secondary processing elements bordering the sub-array. The processing unit can further include a controller, which is in communication with each of the processing elements in the array.

For computing a convolution, the controller can pre-load the activation values from the activations matrix into the primary processing elements such that each primary processing element stores a corresponding activation value. During an initial clock cycle of the convolution computation, the controller can select a specific weight value from the weights kernel and can load that specific weight value into all the primary processing elements in the sub-array so that each of the primary processing elements can perform a multiply-accumulate operation using the corresponding activation value stored therein and that specific weight value. In other words, the primary processing elements will perform parallel multiply-accumulate operations, each using the corresponding activation value stored therein and the same specific weight value. During each successive clock cycle of the convolution computation, the controller can follow a spiral pattern to select the next weight value from the weights kernel. During each successive clock cycle of the convolution computation, the controller can also follow the spiral pattern when controlling selections, within the processing elements, of accumulated partial product inputs to be processed at each clock cycle.

In one particular embodiment, the processing unit can include array of processing elements. The array of processing elements can include a sub-array of primary processing elements, where each primary processing element can include a register, a multiplexor and a multiply-accumulate unit. The array of processing elements can also include secondary processing elements that border the sub-array (e.g., columns of secondary processing elements on the left and right sides of the sub-array and rows of secondary processing elements on the top and bottom sides of the sub-array), where each secondary processing element includes a multiplexor and a buffer. The controller can be in communication with all the processing elements in the array (i.e., with both the primary processing elements and the secondary processing elements).

For computing a convolution, the controller can access an activations matrix from a memory and can pre-load the activation values from that activations matrix into the registers in the primary processing elements, respectively, such that each register of each primary processing element stores a corresponding activation value. That is, for a N×N activations matrix and a N×N sub-array of primary processing elements, the activation value from a given position in the matrix can be pre-loaded into a register of a primary processing element at the same position. During an initial clock cycle of the convolution computation, the controller can select a specific weight value from the weights kernel and can load that specific weight value into all the primary processing elements in the sub-array and, particularly, into all of the multiply-accumulate units therein, so that each multiply-accumulate unit of each primary processing element can perform a multiply-accumulate operation using the corresponding activation value stored in the register and that specific weight value. In other words, the multiple-accumulate units in the primary processing elements will perform parallel multiply-accumulate operations, each using the corresponding activation value stored in the register of the primary processing element and the same specific weight value. During each successive clock cycle of the convolution computation, the controller can follow a spiral pattern to select the next weight value from the weights kernel. That is, with each successive clock cycle, the controller selects the next specific weight value (which will be loaded into the primary processing elements and used during parallel multiply-accumulate operations performed by those primary processing elements) by following a spiral pattern starting in the top left corner of the weights kernel and moving one by one around the outside of the kernel and then spiraling inward until a last weight at a center of the weights kernel is processed. During each successive clock cycle of the convolution computation, the controller can also follow the spiral pattern when controlling selections, within the processing elements, of accumulated partial product inputs to be processed at each clock cycle. That is, at the end of each clock cycle, accumulated partial product inputs are received by each multiplexor in each processing element from all immediately adjacent processing elements and at the beginning of the next clock cycle the controller sends out a control signal to cause selection for processing of only one of those inputs so that the same spiral pattern is followed (as discussed in further in the detailed description section below). Within the primary processing elements, the selected accumulated partial product inputs will be used during the multiply-accumulate operations, whereas within the second processing elements, the selected accumulated partial product input will simply be buffered. Buffering of the selected accumulated partial product inputs by the secondary processing elements ensures that during subsequent clock cycles the correct accumulated partial product inputs will be moved into the primary processing elements for computing the convolution.

Also disclosed herein are embodiments of a processing method performed using the above-described processing unit, which is configured to compute a convolution of an activations matrix (e.g., a N×N activations matrix, also referred to herein as an inputs matrix) and a weights kernel (e.g., a M×M weights kernel, also referred to herein as a convolution filter matrix). As mentioned above, the processing unit can include an array of processing elements. The array can include a sub-array of primary processing elements corresponding to the activations matrix (e.g., a N×N sub-array of primary processing elements). The array can also include secondary processing elements that border the sub-array. The processing unit can further include a controller, which is in communication with each of the processing elements in the array.

For computing a convolution, the method can include pre-loading, by the controller, of the activation values from the activations matrix into the primary processing elements such that each primary processing element stores a corresponding activation value. The method can further include, during an initial clock cycle of the convolution computation, selecting a specific weight value from the weights kernel and loading the specific weight value into all the primary processing elements in the sub-array so that each of the primary processing elements can perform a multiply-accumulate operation using the corresponding activation value stored therein and that specific weight value. In other words, the primary processing elements will perform parallel multiply-accumulate operations, each using the corresponding activation value stored therein and the same specific weight value. Selection of the specific weight value and loading of the specific weight value into the primary processing elements can be performed by the controller. The method can further include, during each successive clock cycle of the convolution computation, selecting the next weight value from the weights kernel for loading into the primary processing elements. Selection of the next weight value from the weights kernel can be performed by the controller following a spiral pattern. The method can further include, during each successive clock cycle of the convolution computation, controlling selections within the processing elements of accumulated partial product inputs to be processed. Control of the accumulated partial product input selections can also be performed by the controller so as to follow the spiral pattern.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 6 is a schematic diagram illustrating an exemplary primary processing element that can be incorporated into the array of processing elements in the processing unit of FIG. 3;

FIG. 7 is a schematic diagram illustrating an exemplary secondary processing element that can be incorporated into the array of processing elements in the processing unit of FIG. 3;

FIG. 8 is a table illustrating the four different control signals that could during processing by the processing unit of FIG. 3;

FIGS. 9-17 are diagrams illustrating processing that occurs within the processing elements of the array during each of the M² clock cycles needed to compute a convolution with FIG. 9 representing the initial clock cycle and FIGS. 10-17 representing each successive clock cycle thereafter;

FIG. 18 is a drawing illustrating another exemplary activations matrix that can be employed by the processing unit of FIG. 3;

DETAILED DESCRIPTION

Figure 1:
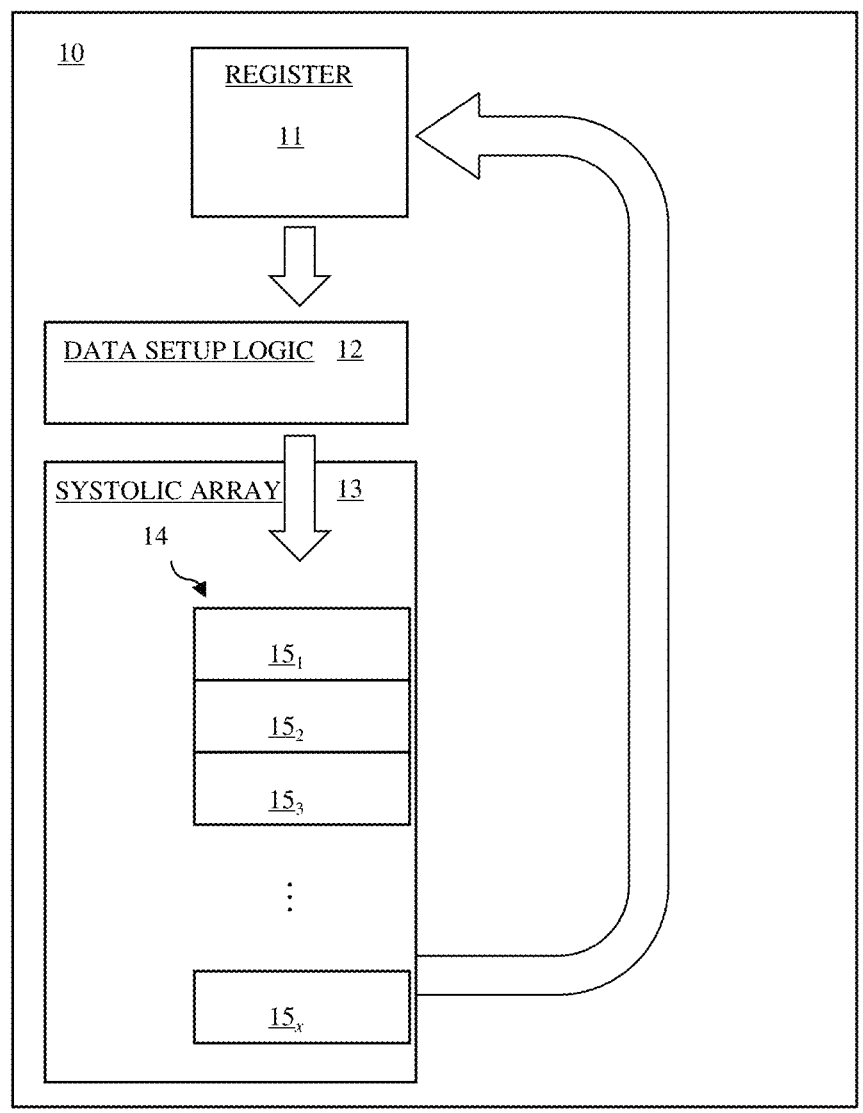
FIG. 1 is a block diagram illustrating a processing unit in which a data setup logic block reorganizes data read out from a memory for input into a systolic array.

As mentioned above, in order to save area and energy, processing units that incorporate systolic arrays (also referred to as systolic processors) have been developed for computing a convolution. Referring to FIG. 1, one exemplary processing unit 10 includes a memory 11 (e.g., a register or buffer) and a systolic array 13. The systolic array 13 includes a pipeline 14 of processing elements (PEs) $15_1$-$15_x$ (e.g., arithmetic logic units (ALUs)). During a convolution operation, the first PE $15_1$ receives a series of first data inputs accessed from the memory 11, processes the first data inputs and forwards a series of first data outputs to the next PE $15_2$ in the pipeline 14. The next PE $15_2$ in the pipeline 14 receives the series of first data outputs from the first PE $15_1$, processes them and forwards a series of second data outputs to the next PE $15_3$ in the pipeline 14; and so on until the last PE $15_x$ in the pipeline 14 outputs a series of final data outputs for storage back in the memory 11. However, to ensure that the first data inputs received by the first PE $15_1$ in the pipeline 14 are in the proper order for processing (i.e., for computing the convolution), the processing unit 10 also incorporates a data setup logic block 12, which is in line between the memory 11 and the first PE $15_1$ in the pipeline 14. The data setup logic block 12 reads the data from the memory 11, reorganizes that data according to a data setup matrix (e.g., using delay elements, such as shift registers) and feeds the correct series of first data inputs into the first PE $15_1$.

Figure 2:
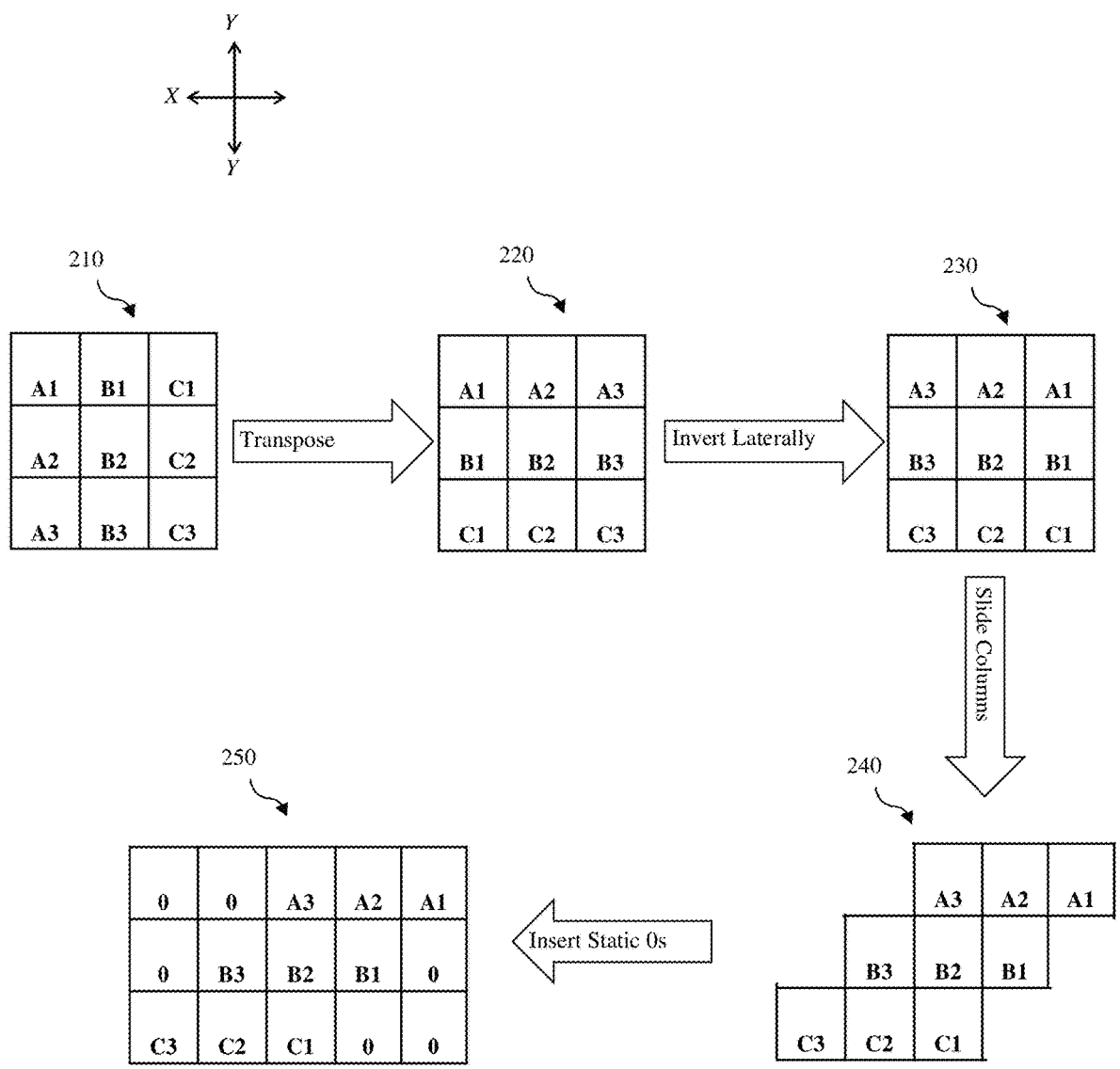
FIG. 2 is a flow chart illustrating exemplary process steps employed to generate a data setup matrix for inputting single-bit data into a systolic array.

FIG. 2 is an exemplary single layer data input matrix 220 employed to generate a data setup matrix 250 for a systolic array. The data input matrix 220 has data input fields arranged in a first number m of rows and a second number n of columns. Each row has data input fields labeled A, B, C, etc. For purposes of illustration, the data input matrix 220 has 3 rows and 3 columns. Thus, row 1 includes data input fields labeled A1, B1, C1; row 2 includes data input fields labeled A2, B2, C2; and row 3 includes data input fields labeled A3, B3, C3. The rows of the data input fields of the data input matrix 220 should be oriented in the same direction as the rows of memory cells in a memory array. Thus, preliminary processing may require an initial data input matrix 210 to be transposed if the row of data input fields are oriented in the X direction (as shown). Next, the data input matrix 220 can be laterally inverted (i.e., flipped horizontally) so that the first row (e.g., row 1 with A1, B1, C1) is now on the far right side of the laterally inverted matrix 230 and so that the last row (e.g., row 3 with A3, B3, C3) is now on the far left side of the laterally inverted matrix 230. Individual columns within the laterally inverted matrix 230 can then be slid to generate a torqued matrix 240 with opposing sides that are stepped at the beginnings, ends or beginnings and ends of the n columns. Finally, static zero value input fields can be added to fill in the stepped opposing sides and complete a rectangular-shaped data setup matrix 250. Such a single-layer (i.e., two dimensional) data setup matrix 250 can be employed when the systolic array is designed to process a series of single-bit inputs. As a result, the data setup matrix 250 has ((m+n)−1) rows and n columns of data input fields. A processing unit with a 128 by 128 multiply and accumulate (MAC) array requires a data setup logic block with 8000 shift registers to accomplish such a data setup. Thus, the use of the data setup logic block 12 is also costly in terms of chip area consumption and energy consumption.

In view of the foregoing, disclosed embodiments of a processing unit are configured to compute a convolution of an activations matrix (e.g., a N×N activations matrix, also referred to herein as an inputs matrix) and a weights kernel (e.g., a M×M weights kernel, also referred to herein as a convolution filter matrix). The processing unit specifically employs an array of processing elements and a hardware-implemented spiral algorithm to compute the convolution. Due to this spiral algorithm, the need for a discrete data setup logic block is avoided, activation values from the activations matrix can be pre-loaded into processing elements only one time so that the need to repeatedly access the activations matrix is avoided, and the computation can be completed in a relatively low number of clock cycles, which is independent of the number of activation values in the activation matrix and which is equal to the number of weight values in a weights kernel. That is, a convolution computation using a M×M weights kernel can be completed in M² clock cycles.

Figure 3:
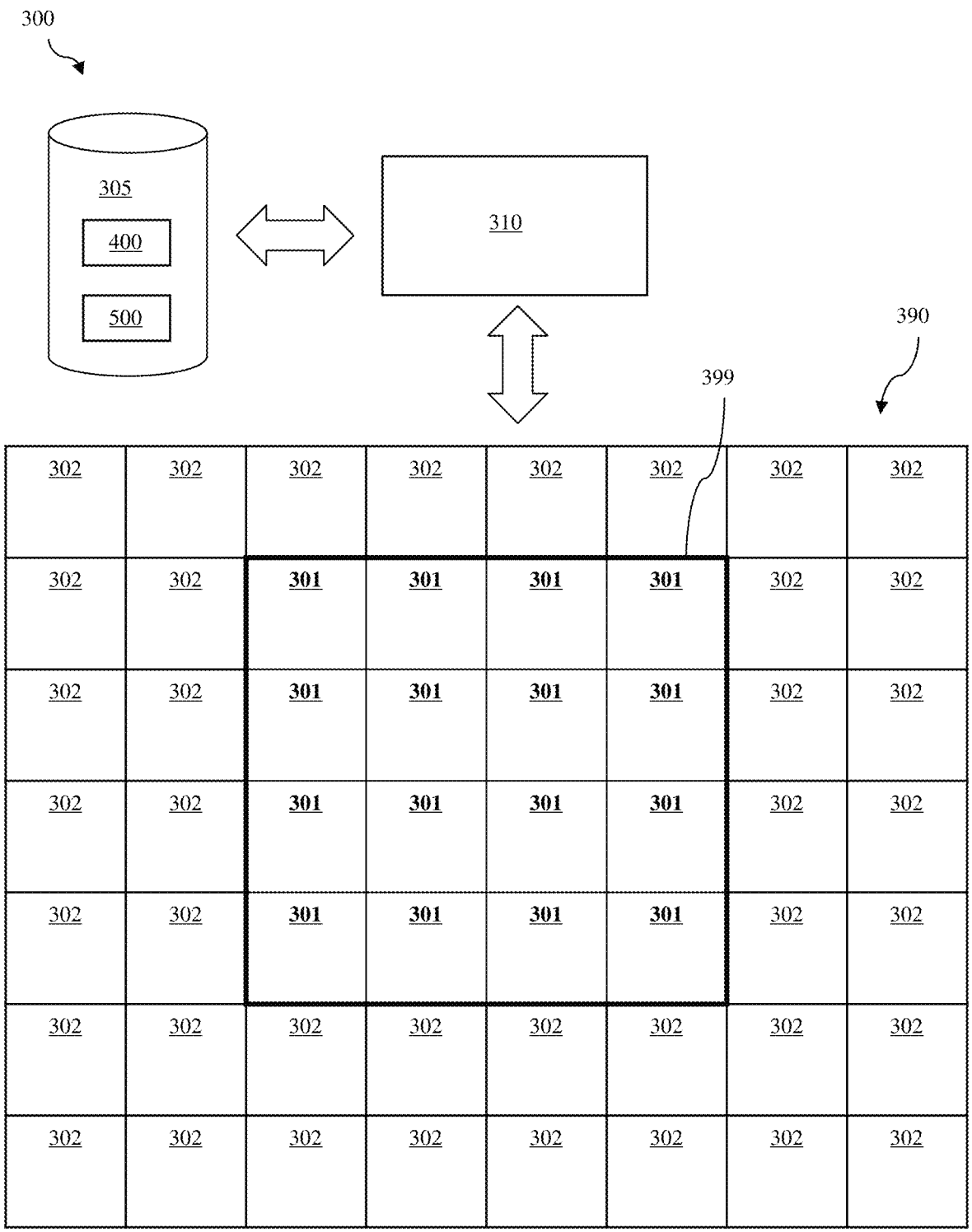
FIG. 3 is a schematic drawing illustrating disclosed embodiments of a processing unit configured to compute a convolution of an activations matrix and a weights kernel.

More particularly, referring to FIG. 3, disclosed herein are embodiments of a processing unit 300 that is configured to compute a convolution of an activations matrix (also referred to herein as an inputs matrix) and a weights kernel (also referred to herein as a convolution filter matrix). This processing unit 300 can include an array 390 of processing elements and a controller 310, which is in communication with the processing elements in the array 390 and which is further in communication with a memory 305 that stores an activations matrix 400 and a weights kernel 500.

Figures 4, 5:
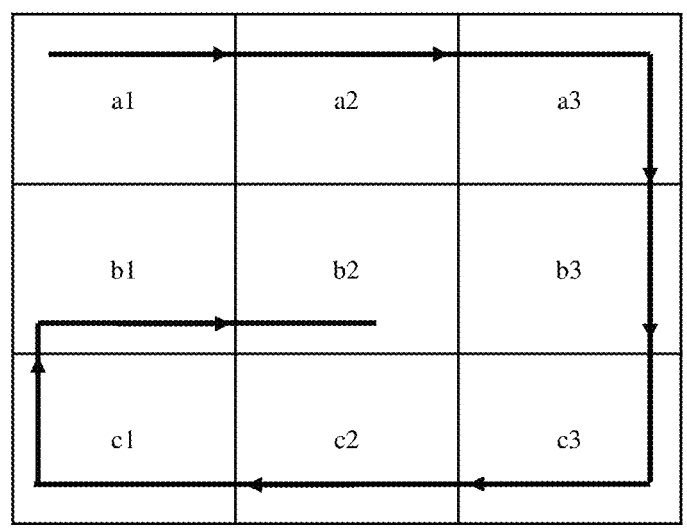
FIG. 4 is a drawing illustrating an exemplary activations matrix that can be employed by the processing unit of FIG. 3.
FIG. 5 is a drawing illustrating an exemplary weights kernel that can be employed by the processing unit of FIG. 3.

The activations matrix 400 can be a N×N activations matrix. That is, the activations matrix 400 can have some number (N) of rows of activation values (also referred to herein data input values) and the same number (N) of columns of activation values. For purpose of illustration, an exemplary 4×4 activations matrix 400 is shown in FIG. 4 and includes four rows A-D and four columns 1-4 of activation values (i.e., activation values A1, A2, A3, A4, B1, B2, etc.). As illustrated, the activations matrix 400 has been transposed with A values being in the top row, B values being in the second row, and so on. It should be understood that the exemplary activations matrix shown in FIG. 4 is not intended to be limiting and that, alternatively, N could be any number that is greater than or equal to two.

The weights kernel 500 can be a M×M weights kernel. That is, the weights matrix 500 can have some number (M) of rows of weight values and the same number (M) of columns of weight values). For purpose of illustration, a 3×3 weights kernel 500 is shown in FIG. 5 and includes three rows a-c and three columns 1-2 of weight values (i.e., weight values a1, a2, a3, b1, b2, etc.). It should be understood that the exemplary weights kernel shown in FIG. 5 is not intended to be limiting and that, alternatively, M could be any number that is equal to or less than N.

As discussed above, convolution computations of an activations matrix and a weights kernel are performed by a variety of different types of applications. For example, in image processing applications an activations matrix can correspond to an array of pixels in an image and the activations values (also referred to as input values) at specific locations in the activations matrix can indicate the image intensity of the pixels at the corresponding locations in the image. A weights kernel can be developed (i.e., learned) for a specific feature and can include different weight values, which are to be applied to each activation value in a series of multiply-accumulate operations. By convolving the activations matrix and weights kernel, the specific feature may be detected in the image. Other applications that perform such convolution computations include, but are not limited to, artificial intelligence (AI) and machine learning (ML) applications (e.g., tensor processing (TP) applications), digital signal processing (DSP) applications, advanced driver assist system (ADAS) applications, neural network (NN) and deep learning (DL) applications, fast Fourier transforms (FFTs), and digital filtering applications (e.g., finite impulse response (FIR) and infinite impulse response (IIR)).

Regardless of the purpose of the convolution computation, the array 390 of processing elements can include a sub-array 399 of primary processing elements 301. The sub-array 399 of primary processing elements can have a same number of rows and columns as the activations matrix. That is, for a N×N activations matrix, the array 390 of processing elements will include a N×N sub-array 399 of primary processing elements 301 (i.e., the activations matrix and sub-array 399 of primary processing elements 301 will have the same number (N) of rows and the same number (N) of columns). FIG. 6 is a schematic diagram illustrating an exemplary primary processing element 301 that can be incorporated into the sub-array 399. As shown and discussed in greater detail below, each primary processing element 301 can include a register 321 (i.e., a storage element), a multiplexor 325, and a multiply-accumulate (MAC) unit 322 (including a multiplier 323 and an accumulator 324).

The array 390 of processing elements can further include secondary processing elements 302, which border the sub-array 399. That is, the array 390 can include columns of secondary processing elements on the left and right sides of the sub-array 399 and rows of secondary processing elements on the top and bottom sides of the sub-array 399. FIG. 7 is a schematic diagram illustrating an exemplary secondary processing element 302. As shown and discussed in greater detail below, each secondary processing element can include a multiplexor 335 and a buffer 331 connected to the multiplexor 335.

For purposes of illustration, the array 390 shown in FIG. 3 includes a 4×4 sub-array of primary processing elements 301, a pair of columns of secondary processing elements 302 on the left side of the array, a pair of columns of secondary processing elements 302 on the right side of the array, a pair of rows of secondary processing elements 302 at the bottom side of the array and a single row of secondary processing elements 302 at the top side of the array. As discussed in greater detail below, the secondary processing elements function as place holders for accumulated partial products that are moved between processing elements within the array during the convolution computation. Thus, the number of columns and rows of secondary processing elements bordering each side (i.e., left, right, bottom and top) of the sub-array 399 will vary depending upon the size of the sub-array 399.

Prior to performing a convolution computation, the controller 310 can access the activations matrix 400 from the memory 305 and can further pre-load (i.e., can be adapted to pre-load, configured to pre-load, can execute a program to cause pre-loading of, etc.) the activation values (i.e., A1, A2, A3, A4, B1, B2, etc.) from that activations matrix 400 into the primary processing elements 301 in the sub-array 399 (e.g., see data signal 311, shown in FIG. 6). Specifically, the controller 310 can cause the activation values from the activations matrix to be pre-loaded into the registers 321, respectively, of the primary processing elements 301 in the sub-array 399 such that each register 321 of each primary processing element 301 stores a corresponding activation value. That is, for a N×N activations matrix 400 and a N×N sub-array 399 of primary processing elements 301, the activation value from a given position in the matrix can be pre-loaded into a register 321 of a primary processing element 301 at the same position. The registers 321 in the primary processing elements 301 can store (i.e., can be adapted to store, can be configured to store, etc.) the activation values for use throughout convolution computation as discussed below, thereby avoiding the need to repeatedly access the activations matrix.

At each clock cycle in the convolution computation, the controller 310 can access the weights kernel 500 from the memory 305, can select (i.e., can be adapted to select, can configured to select, can execute a program to cause selection of, etc.) a specific weight value from the weights kernel 500 and can load (i.e., can be adapted to load, can be configured to load, can execute a program to cause loading of, etc.) that specific weight value into all the primary processing elements 301 in the sub-array 399 and, particularly, into the multipliers 323 of all of MAC units 322 therein (e.g., see data signal 312, shown in FIG. 6) so that each MAC unit 322 of each primary processing element 301 can perform a MAC operation using the corresponding activation value stored in the register 325 and that specific weight value. In other words, the multiple-accumulate units in the primary processing elements will perform parallel MAC operations, each using the corresponding activation value stored in the register of the primary processing element and the same specific weight value.

At the initial clock cycle of the convolution computation, the controller 310 can select and load the first weight value (e.g., a1), which is located in the top left corner of the weights kernel 500. During each successive clock cycle of the convolution computation, the controller 310 can follow a spiral pattern (i.e., can be adapted to follow a spiral pattern, configured to follow a spiral pattern, can execute a program that follows a spiral pattern, etc.) for selection of the next weight value from the weights kernel 500. That is, with each successive clock cycle, the controller 310 can select the next specific weight value (which will be loaded into the primary processing elements and used during parallel MAC operations performed by those primary processing elements) by following a spiral pattern that moves one by one around the outside of the kernel 500 and spiraling inward until a last weight (e.g., b2) at a center of the weights kernel is processed. As illustrated in FIG. 5, for a 3×3 weights kernel, the spiral pattern moves from the top left corner (e.g., a1) to the right (i.e., selecting a2), to the right again (i.e., selecting a3), down (i.e., selecting b3), down again (i.e., selecting c3), to the left (i.e., selecting c2), to the left again (i.e., selecting c1), up (i.e., selecting b1), and to the right again (i.e., selecting b2).

During each successive clock cycle of the convolution computation, the controller 310 can also follow this same spiral pattern (i.e., can be adapted to follow the same spiral pattern, can be configured to follow the same spiral pattern, can execute a program to cause following of the same spiral pattern, etc.) when controlling the accumulated partial product input selections that are made by the multiplexors 325 in the primary processing elements 301 and by the multiplexors 335 in the secondary processing elements. More specifically, at the end of each clock cycle in the convolution computation, accumulated partial product inputs are forwarded by the processing elements to all immediately adjacent processing elements such that each multiplexor in each processing element receives accumulated partial product inputs from all immediately adjacent processing elements. It should be noted that, since the sub-array 399 of primary processing elements 301 is bordered by secondary processing elements 399, each primary processing element 301 will be immediately adjacent to four other processing elements (i.e., a left-side adjacent processing element, a top-side adjacent processing element, a right-side adjacent processing element and a bottom-side adjacent processing element) and will receive four accumulated partial product inputs. Thus, the multiplexor 325 in each primary processing element 301 can be a four-input, one-output multiplexor (as shown in the exemplary primary processing element shown in FIG. 6). Furthermore, since the secondary processing elements 302 border the sub-array, some may be immediately adjacent to four other processing elements so as to receive four accumulated partial product inputs and others may not be (i.e., so as to receive a lesser number of accumulated partial product inputs). Thus, while the multiplexor 335 in the exemplary secondary processing element shown in FIG. 7 is a four-input, one-output multiplexor configured to receive inputs from four adjacent processing elements, it should be understood that, depending upon the position of the secondary processing element within the array, this multiplexor 335 could a three-input or two-input multiplexor.

In any case, in order to follow the spiral pattern when controlling the selections of accumulated partial product inputs to be processed in the processing elements 301 and 302 at the beginning of each clock cycle, the controller 310 can generate and output the same control signal 314 (i.e., can be adapted to generate and output the same control signal, can be configured to generate and output the same control signal, can execute a program causing generation and output the same control signal, etc.) to the multiplexors in all of the processing elements in the array (i.e., the multiplexor 325 in each primary processing element 301 and to the multiplexor 335 in each secondary processing element 302), thereby causing selection by each of the multiplexors of an accumulated partial product input received from an adjacent processing element at the same relative position. That is, the control signal will cause all multiplexors in all processing elements to select accumulated partial product inputs received from a left-side adjacent processing element, from a top-side adjacent processing element, from a right-side adjacent processing element or from a bottom-side adjacent processing element.

FIG. 8 is a table illustrating the four different control signals 314 that could be sent by the controller 310 to the multiplexors 325, 335 of the processing elements 301, 302 during any given clock cycle to cause the multiplexors to select accumulated partial product inputs received from an adjacent processing element at the same relative position. For example, the controller 310 can generate and output a first control signal (e.g., (00)) to cause selection by the multiplexors of a first accumulated partial product input received from the left-side adjacent processing element when the spiral pattern calls for moving to the right to select the next weight. The controller 310 can generate and output a second control signal (e.g., (10)) to cause selection of a second accumulated partial product input received from the top-side adjacent processing element when moving down to select the next weight. The controller 310 can generate and output a third control signal (e.g., (11)) to cause selection of a third accumulated partial product input received from the right-side adjacent processing element when moving to the left to select the next weight. Finally, the controller 310 can generate and output a fourth control signal (e.g., (01)) to cause selection of a fourth accumulated partial product input received from the bottom-side adjacent processing element when moving up in to select the next weight. Thus, the order of the control signals can be pre-established to ensure that the same spiral pattern is followed. For example, given the spiral pattern shown in FIG. 5 for a 3×3 weights kernel, the control signals 314 received by the multiplexors can follow the following order with each successive clock signal after the initial clock signal of the convolution: 00, 00, 10, 10, 11, 11, 01, and 00.

Within the primary processing elements 301, the selected accumulated partial product inputs 328 will be output to the accumulator 324 of the MAC unit 322 and used to perform the MAC operations. Specifically, during any given clock cycle, the multiplier 323 can determine the product (i.e., can be adapted to determine the product, can be configured to determine the product, etc.) of the activation value 326 for the primary processing element, which was previously stored in the register 321, and the specific weight value 312 received from the controller 310. The accumulator 324 can then determine the sum 329 (i.e., can be adapted to determine the sum, can be configured to determine the sum, etc.) of the product 327 from the multiplier 322 and the selected accumulated partial product 328 from the multiplexor 325. At the end of the clock cycle, the accumulator 324 can output this sum 329 to each immediately adjacent processing element (i.e., to the left-side processing element, to the right-side processing element, to the top-side processing element and to the bottom-side processing element) for possible selection in the next clock cycle (i.e., as an accumulated partial product input available for selection by the multiplexor of that adjacent processing element during a next clock cycle). Within the second processing elements 302, the selected accumulated partial product input 338 will simply be buffered (i.e., temporarily held) by the buffer 331 and then output at the end of the clock cycle to each immediately adjacent processing element for possible selection in the next clock cycle (i.e., as an accumulated partial product input available for selection by the multiplexor of that adjacent processing element during a next clock cycle). Buffering of the selected accumulated partial product inputs by the buffers 331 of the secondary processing elements 302 ensures that during subsequent clock cycles the correct accumulated partial product inputs will be moved into the MAC units 322 of the primary processing elements 301 for computing the convolution. With a processing unit 300, which is configured as described above, the total number (Y) of clock cycles required to complete the convolution computation using a M×M weights kernel 500 will be $M^2$.

More particularly, FIGS. 9-17 are diagrams illustrating processing that occurs within the processing elements of the array 390 (including within the primary processing elements 301 of the N×N sub-array 399 and the secondary processing elements 302 bordering the sub-array 399) following pre-loading of the activation values (A1, A2, A3, etc.) of the N×N activations matrix 400 into the registers 321 of the primary processing elements 301. FIGS. 9-17 represent processing during each of the $M^2$ clock cycles needed to compute the convolution with FIG. 9 representing the initial clock cycle and FIGS. 10-17 representing each successive clock cycle thereafter.

As illustrated in FIG. 9, once the activation values are pre-loaded, the convolution computation can be with the controller 310 loading the weight (a1) from the top left of the weights kernel into the multipliers 323 of all of the MAC units 322 of all of the primary processing elements 301. Each multiplier 323 can multiple its pre-loaded activation value by the weight (a1). Since this is the initial clock cycle, no accumulated partial products are available (i.e., the accumulated partial product is 0) and so the output to each of the adjacent processing elements is equal to the product.

Figure 10:
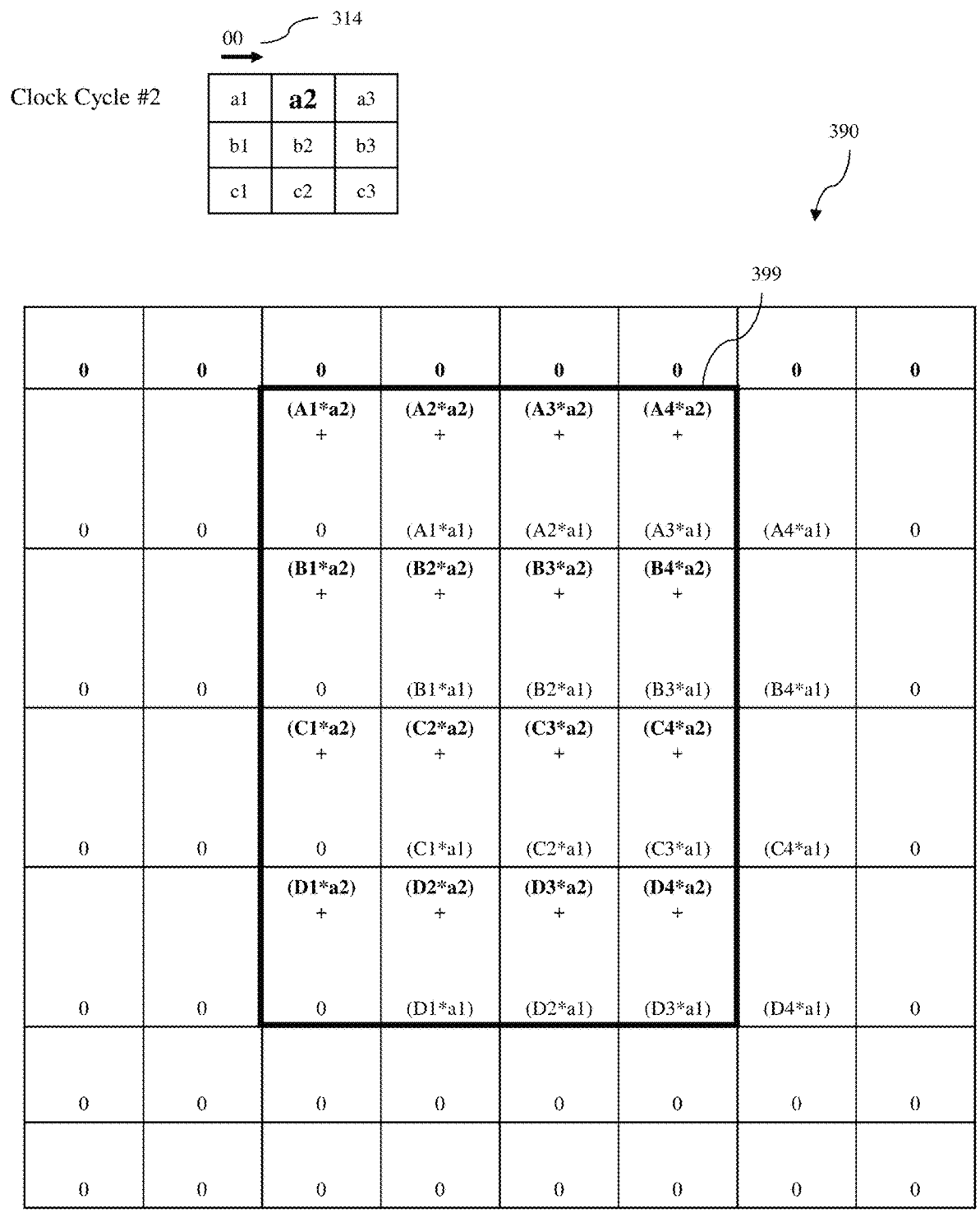

As illustrated in FIG. 10, the controller 310 follows the spiral pattern by loading the next weight (a2) into the multipliers 323 of all of the MAC units 322 of all of the primary processing elements 301. Each multiplier 323 can multiply its pre-loaded activation value by the weight (a2). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can generate and output the first control signal (00) to each of the processing elements in the array to cause selection of the input from the left-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 11, the controller 310 follows the spiral pattern by loading the next weight (a3) into the multipliers 323 of all of the MAC units 322 of all of the primary processing elements 301. Each multiplier 323 can multiply its pre-loaded activation value by the weight (a3). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can again generate and output the first control signal (00) to each of the processing elements in the array to cause selection of the input from the left-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 12, the controller 310 follows the spiral pattern by loading the next weight (b3) into the multipliers 323 of all of the MAC units 322 of all of the primary processing elements 301. Each multiplier 323 can multiple its pre-loaded activation value by the weight (b3). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can generate and output the second control signal (10) to each of the processing elements in the array to cause selection of the input from the top-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 13, the controller 310 follows the spiral pattern by loading the next weight (c3) into the multipliers 323 of all of the MAC units 322 of all of the primary processing elements 301. Each multiplier 323 can multiple its pre-loaded activation value by the weight (c3). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can again generate and output the second control signal (10) to each of the processing elements in the array to cause selection of the input from the top-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 14, the controller 310 follows the spiral pattern by loading the next weight (c2) into the multipliers 323 of all of the MAC units 322 of all of the primary processing elements 301. Each multiplier 323 can multiple its pre-loaded activation value by the weight (c2). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can generate and output the third control signal (11) to each of the processing elements in the array to cause selection of the input from the right-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 15, the controller 310 follows the spiral pattern by loading the next weight (c1) into the multipliers 323 of all of the MAC units 322 of all of the primary processing elements 301. Each multiplier 323 can multiple its pre-loaded activation value by the weight (c1). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can again generate and output the third control signal (11) to each of the processing elements in the array to cause selection of the input from the right-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

As illustrated in FIG. 16, the controller 310 follows the spiral pattern by loading the next weight (b1) into the multipliers 323 of all of the MAC units 322 of all of the primary processing elements 301. Each multiplier 323 can multiple its pre-loaded activation value by the weight (b1). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can generate and output the fourth control signal (01) to each of the processing elements in the array to cause selection of the input from the bottom-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

Figure 17:
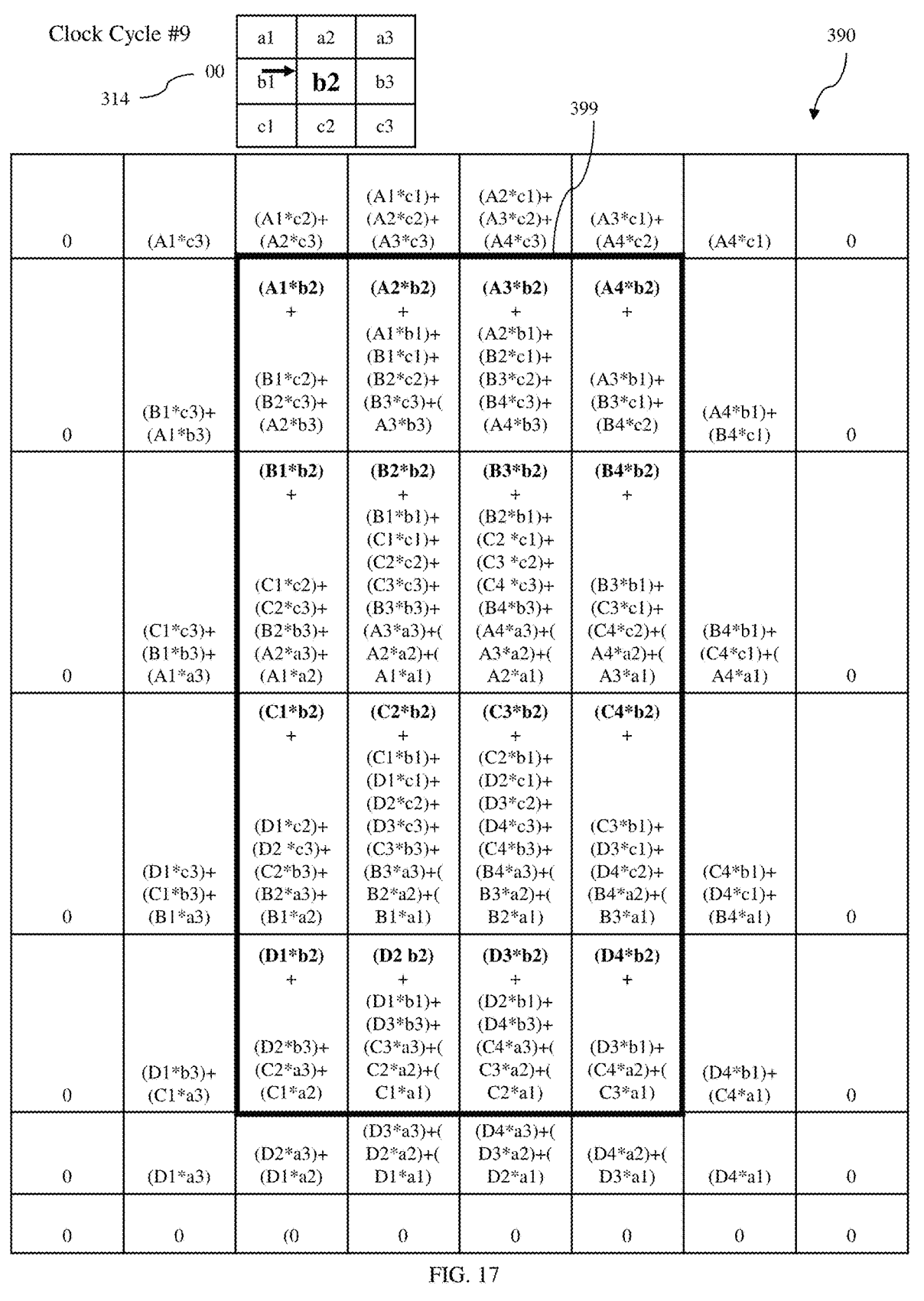

Finally, as illustrated in FIG. 17, the controller 310 follows the spiral pattern by loading the next weight (b2) into the multipliers 323 of all of the MAC units 322 of all of the primary processing elements 301. Each multiplier 323 can multiple its pre-loaded activation value by the weight (b2). The controller 310 also follows the spiral pattern by outputting the appropriate control signal 314 to control selection by the multiplexors 325, 335 of an input for the accumulator 324 in the primary processing elements 301 or the buffer 331 in the secondary processing elements 302. Specifically, the controller 310 can again generate and output the first control signal (00) to each of the processing elements in the array to cause selection of the input from the bottom-side adjacent processing element. Within each primary processing element 301, the accumulator 324 will add the selected accumulated partial product input to the product from the multiplier 323 and output the sum to each adjacent processing element. Within each secondary processing element 302, the buffer will buffer the selected accumulated partial product input and then output it to each adjacent processing element.

Figure 19:
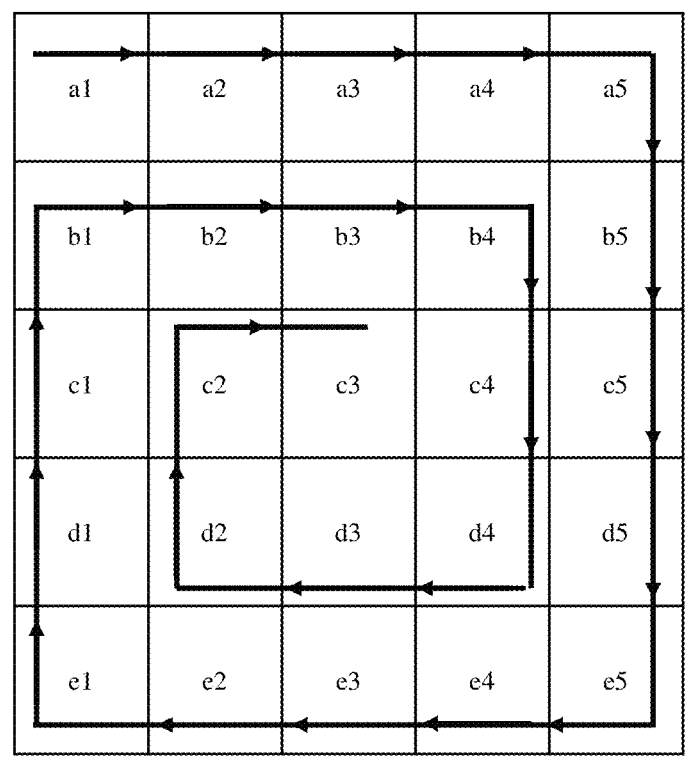
FIG. 19 is a drawing illustrating another exemplary weights kernel that can be employed by the processing unit of FIG. 3.

It should be understood that the sizes of the activations matrix, array of processing elements and the weights kernel shown in the figures and discussed above for purposes of illustrating the invention are not intended to be limiting. As mentioned above, an activations matrix can have any number (N) of rows of activation values (also referred to herein data input values) and the same number (N) of columns of activation values. For example, see the exemplary 25×25 activations matrix shown in FIG. 18. In this case, the size of the sub-array of primary processing elements will correspond to the size of the activations matrix (i.e., the sub-array of primary processing elements will be a 25×25 sub-array). Furthermore, as mentioned above, the weights matrix can have a number (M) of rows of weight values and the same number (M) of columns of weight values), where M is any number that is greater than or equal to two. For example, see the 5×5 weights kernel shown in FIG. 19. It should be understood that with this 5×5 weights kernel the number of clock cycles required to complete the convolution computation will be equal to $M^2$ or 25 and, due to the larger size of the weights kernel, the order of the control signals output by the controller 310 will vary to correspond to the spiral pattern.

Figure 20:
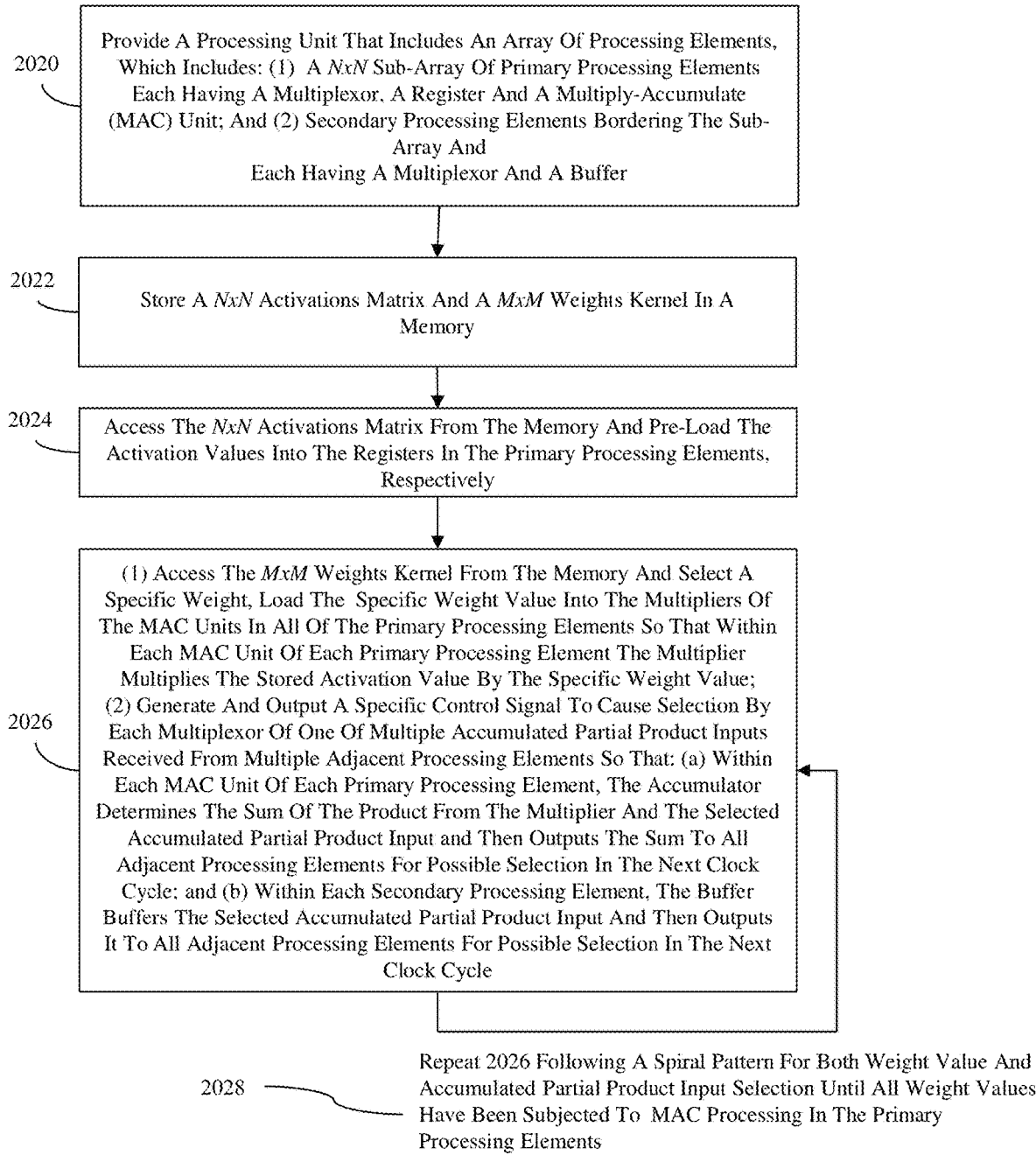
FIG. 20 is a flow diagram illustrating embodiments of a processing method and, particularly, a method of controlling operations performed by a processing unit, which is configured to compute a convolution of an activations matrix and a weights kernel.

Referring to the flow diagram of FIG. 20, also disclosed herein are embodiments of a processing method and, particularly, a method of controlling operations performed by a processing unit, which is configured to compute a convolution of an activations matrix and a weights kernel. The method can include providing a processing unit, such as the processing unit 300 described in detail above and illustrated in FIG. 3 (see process step 2020 in FIG. 20). Specifically, the processing unit 300 can include an array 390 of processing elements and a controller 310, which is in communication with the processing elements in the array 390 and which is further in communication with a memory 305. The array 390 of processing elements can include a N×N sub-array 399 of primary processing elements 301. Each primary processing element 301 can include a register 321 (i.e., a storage element), a multiplexor 325, and a multiply-accumulate (MAC) unit 322 (including a multiplier 323 and an accumulator 324) (e.g., as shown in FIG. 6 and described above). The array 390 of processing elements can also include secondary processing elements 302, which border the sub-array 399. That is, the array 390 can include columns of secondary processing elements on the left and right sides of the sub-array 399 and rows of secondary processing elements on the top and bottom sides of the sub-array 399. Each secondary processing element 302 can include a multiplexor 335 and a buffer 331 connected to the multiplexor 335 (e.g., as shown in FIG. 7 and described above).

The method can also include storing an activations matrix 400 and a weights kernel 500 in the memory 305 (see process step 2022 in FIG. 20). The activations matrix 400 can be a N×N activations matrix (e.g., as shown in FIG. 4). It should be understood that the exemplary sub-array of primary processing elements shown in FIG. 3 and the exemplary activations matrix 400 shown in FIG. 4 where N equals 4 are not intended to be limiting. Alternatively, N could be any number that is greater than or equal to two. The weights kernel 500 can be a M×M weights kernel. It should be understood that the exemplary weights kernel shown in FIG. 5 is not intended to be limiting and that, alternatively, M could be any number that is equal to or less than N.

The method can further include, prior to performing a convolution computation, accessing (e.g., by the controller 310) the activations matrix 400 from the memory 305 and pre-loading (e.g., by the controller 310) the activation values from that activations matrix 400 into the primary processing elements 301 in the sub-array 399 (see process step 2024 in FIG. 20). Specifically, at process step 2024, the activation values from the activations matrix can be pre-loaded into the registers 321, respectively, of the primary processing elements 301 in the sub-array 399 such that each register 321 of each primary processing element 301 stores a corresponding activation value. That is, for a N×N activations matrix 400 and a N×N sub-array 399 of primary processing elements 301, the activation value from a given position in the matrix can be pre-loaded into a register 321 of a primary processing element 301 at the same position. The registers 321 in the primary processing elements 301 can store the activation values for use throughout the convolution computation, as discussed below, thereby avoiding the need to repeatedly access the activations matrix.

The method can further include, after the pre-loading of the activation values at process step 2024, performing the convolution operation at process steps 2026-2028 of FIG. 20. Specifically, the method can include, at each clock cycle, accessing (e.g., by the controller 310 from the memory 305) the M×M weights kernel and selecting (e.g., by the controller 310) a specific weight value. The method can further include loading the specific weight value into the multipliers 323 of all the MAC units 322 of all of the primary processing elements 301 so that within each MAC Unit of each primary processing element the multiplier determines the product of (i.e., multiplies) the stored activation value by the specific weight value. Additionally, the method can include, at each clock cycle, generating and outputting (e.g., by the controller 310) a specific control signal to cause selection by each multiplexor in each processing element of one of multiple accumulated partial product inputs received from multiple adjacent processing elements so that the following processing occurs: (a) within each MAC unit 322 of each primary processing element 301, the accumulator 324 determines the sum 329 of (i.e., accumulates) the product 327 from the multiplier 323 and the selected accumulated partial product input 328 from the multiplexor 325 and then outputs the sum 329 at the end of the clock cycle to all immediately adjacent processing elements for possible selection in the next clock cycle; and (b) within each secondary processing element 302, the buffer 331 buffers (i.e., temporarily holds) the selected accumulated partial product input 338 and then outputs it at the end of the clock cycle to all adjacent processing elements for possible selection in the next clock cycle. Such processing can be repeated at each successive clock cycle specifically following a spiral pattern for both weight value selection and accumulated partial product input selection until all weight values in the kernel have been subjected to MAC processing in the primary processing elements.

More specifically, at the initial clock cycle of the convolution computation, the method can include selecting a first weight value (e.g., a1) from the top left corner of the weights kernel 500 and loading that first weight value into the multipliers 323 of the MAC units 322 of the primary processing elements 301 to be used for parallel MAC operations.

The method can further include, during each successive clock cycle of the convolution computation, selecting the next specific weight value that will be loaded into the primary processing elements and used during parallel MAC operations by following a spiral pattern. Such a spiral pattern moves one by one around the outside of the kernel 500 and spiraling inward until a last weight (e.g., b2) at a center of the weights kernel is processed. As illustrated in FIG. 5, for a 3×3 weights kernel, the spiral pattern moves from the top left corner (e.g., a1) to the right (i.e., selecting a2), to the right again (i.e., selecting a3), down (i.e., selecting b3), down again (i.e., selecting c3), to the left (i.e., selecting c2), to the left again (i.e., selecting c1), up (i.e., selecting b1), and to the right again (i.e., selecting b2).

The method can also include, during each successive clock cycle of the convolution computation, also following this same spiral pattern when controlling the accumulated partial product input selections that are made by the multiplexors 325 in the primary processing elements 301 and by the multiplexors 335 in the secondary processing elements 302. More specifically, at the end of each clock cycle in the convolution computation, accumulated partial products are forwarded (as inputs) by the processing elements to all immediately adjacent processing elements such that each multiplexor in each processing element receives accumulated partial product inputs from all immediately adjacent processing elements. At the beginning of the next clock cycle, the same control signal 314 can be generated and output (e.g., by the controller 310) to the multiplexors in all of the processing elements in the array (i.e., the multiplexor 325 in each primary processing element 301 and to the multiplexor 335 in each secondary processing element 302), thereby causing selection by each of the multiplexors of an accumulated partial product input received from an adjacent processing element at the same relative position. That is, the control signal will cause all multiplexors in all processing elements to select accumulated partial product inputs received from a left-side adjacent processing element, from a top-side adjacent processing element, from a right-side adjacent processing element or from a bottom-side adjacent processing element. As discussed in detail above, FIG. 8 is a table illustrating four different control signals 314 that could be employed during any given clock cycle to cause the multiplexors 325, 335 of the processing elements 301, 302 to select accumulated partial product inputs received from an adjacent processing element at the same relative position and to ensure that the spiral pattern is followed.

As a result, within the primary processing elements 301 during any given clock cycle, the selected accumulated partial product input 328, the pre-loaded activation value 326 and the selected weight value 312 can be employed to complete a MAC operation. Specifically, the product 327 of the pre-loaded activation value 326 and the specific weight value 312 can be determined (e.g., by the multiplier 323 of the MAC unit 322). Then, the sum 329 of the product 327 from the multiplier 322 and the selected accumulated partial product 328 from the multiplexor 325 can be determined (e.g., by the accumulator 324 of the MAC unit 322). Then, at the end of the clock cycle, this sum 329 can be output by the primary processing element to each immediately adjacent processing element (i.e., to the left-side processing element, to the right-side processing element, to the top-side processing element and to the bottom-side processing element) for possible selection in the next clock cycle (i.e., as an accumulated partial product input available for selection by the multiplexor of that adjacent processing element during a next clock cycle). Furthermore, within the second processing elements 302 during any given clock cycle, the selected accumulated partial product input 338 can be buffered (e.g., by the buffer 331) and then output at the end of the clock cycle to each immediately adjacent processing element for possible selection in the next clock cycle (i.e., as an accumulated partial product input available for selection by the multiplexor of that adjacent processing element during a next clock cycle). As discussed above and illustrated in FIGS. 9-17, buffering of the selected accumulated partial product inputs by the buffers 331 of the secondary processing elements 302 ensures that during subsequent clock cycles the correct accumulated partial product inputs will be moved into the MAC units 322 of the primary processing elements 301 for computing the convolution. Furthermore, with this method, the total number (Y) of clock cycles required to complete the convolution computation using a M×M weights kernel 500 is limited to $M^2$.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/ or "including" specify the presence of stated features, integers, steps, operations, fields, and/or components, but do not preclude the presence or addition of one or more other features, integers, steps, operations, fields, components, and/ or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one field physically contacts another field (without other fields separating the described fields). The term "laterally" is used herein to describe the relative locations of fields and, more particularly, to indicate that a field is positioned to the side of another field as opposed to above or below the other field, as those fields are oriented and illustrated in the drawings. For example, a field that is positioned laterally adjacent to another field will be beside the other field, a field that is positioned laterally immediately adjacent to another field will be directly beside the other field, and a field that laterally surrounds another field will be adjacent to and border the outer sidewalls of the other field. The corresponding structures, materials, acts, and equivalents of all means or step plus function fields in the claims below are intended to include any structure, material, or act for performing the function in combination with other claimed fields as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processing unit comprising:
an array of processing elements comprising a sub-array of primary processing elements and secondary processing elements bordering the sub-array; and
a controller in communication with the processing elements in the array of processing elements,
wherein
for computing a convolution, the controller pre-loads activation values from an activations matrix into the primary processing elements such that each primary processing element stores a corresponding activation value,
during an initial clock cycle, the controller selects a specific weight value from a weights kernel, the controller loads the specific weight value into all the primary processing elements, and each of the primary processing elements performs a multiply-accumulate operation using the corresponding activation value and the specific weight value, the weights kernel comprising a M×M weights kernel comprising M columns of weights and M rows of the weights,
during each successive clock cycle, the controller follows a spiral pattern to select a next weight value from the weights kernel, and
the computing of the convolution is completed in Y clock cycles, where Y is equal to $M^2$.

2. The processing unit of claim 1, further comprising a memory accessible by the controller and storing the activations matrix and the weights kernel.

3. The processing unit of claim 1, wherein the spiral pattern begins with a first weight at a top left corner of the weights kernel and ends with a last weight at a center of the weights kernel.

4. The processing unit of claim 1, wherein:
the sub-array comprises a N×N sub-array comprising N columns of the primary processing elements and N rows of the primary processing elements; and
the activations matrix comprises a N×N matrix comprising N columns of the activations and N rows of the activations.

5. A processing unit comprising:
an array of processing elements comprising a sub-array of primary processing elements and secondary processing elements bordering the sub-array; and
a controller in communication with the processing elements in the array of processing elements,
wherein
for computing a convolution, the controller pre-loads activation values from an activations matrix into the primary processing elements such that each of the primary processing elements stores a corresponding activation value,
during an initial clock cycle, the controller selects a specific weight value from a weights kernel, the controller loads the specific weight value into all the primary processing elements, and each of the primary processing elements performs a multiply-accumulate operation using the corresponding activation value and the specific weight value,
during each successive clock cycle, the controller follows a spiral pattern to select a next weight value from the weights kernel,
each of the primary processing elements comprises a register that stores the corresponding activation value and a multiply-accumulate unit that performs the multiply-accumulate operation,
each of the secondary processing elements comprises a buffer,
each of the primary processing elements and the secondary processing elements further comprises a multiplexor,
during any given clock cycle, the multiplexor in one of the processing elements in the array of processing elements receives accumulated partial product inputs from adjacent processing elements adjacent to the one of the processing elements in the array of processing elements, and multiplexors in the processing elements in the array of processing elements receive a same specific control signal from the controller, and
the specific control signal causes the multiplexor in each of the processing elements in the array of processing elements to select one accumulated partial product input, from one of the adjacent processing elements adjacent to the processing element of that multiplexor, for processing such that the spiral pattern is followed.

6. The processing unit of claim 5, wherein:

the multiply-accumulate unit within each of the primary processing elements comprises a multiplier and an accumulator and, within any given clock cycle, the multiplier determines a product of the corresponding activation value and the specific weight value and the accumulator determines a sum of the product and the accumulated partial product input selected by the multiplexor of that primary processing element and outputs the sum to each of the processing elements in the array of processing elements adjacent to that primary processing element as an accumulated partial product input available for selection during a next clock cycle; and the buffer within each of the secondary processing elements buffers the accumulated partial product input selected by one of the multiplexors of the primary processing elements and subsequently outputs the buffered accumulated partial product to each of the processing elements in the array of processing elements adjacent to that secondary processing element as an accumulated partial product input available for selection during a next clock cycle.

7. The processing unit of claim 6, wherein:

the processing elements in the array of processing elements adjacent to each of the primary processing elements comprises a left-side adjacent processing element, a top-side adjacent processing element, a right-side adjacent processing element and a bottom-side processing element; and the controller outputs a first control signal to cause selection of a first accumulated partial product input from one of the left-side adjacent processing elements when moving right to select the next weight, a second control signal to cause selection of a second accumulated partial product input from a corresponding one of the top-side adjacent processing elements when moving down to select the next weight, a third control signal to cause selection of a third accumulated partial product input from a corresponding one of the right-side adjacent processing elements when moving left to select the next weight and a fourth control signal to cause selection of a fourth accumulated partial product input from a corresponding one of the bottom-side adjacent processing elements when moving up in to select the next weight.

8. A processing unit comprising:

an array of processing elements comprising
  a sub-array of primary processing elements, each of the primary processing elements comprising a register and a multiply-accumulate unit, and
  secondary processing elements bordering the sub-array, each of the secondary processing elements comprising a buffer; and
a controller in communication with the array of processing elements,
wherein
  for computing a convolution, the controller pre-loads activation values from an activations matrix into registers in the primary processing elements such that each register of each of the primary processing elements stores a corresponding activation value,
  during an initial clock cycle, the controller selects a specific weight value from a weights kernel, the controller loads the specific weight value into multiply-accumulate units in the primary processing elements, and each multiply-accumulate unit in each of the primary processing elements performs a multiply-accumulate operation using the corresponding activation value and the specific weight value,
  during each successive clock cycle, the controller follows a spiral pattern when selecting a next weight value from the weights kernel and loads the next weight value into the primary processing elements and the controller further follows the spiral pattern when controlling accumulated partial product input selections within the array of processing elements,
  the sub-array comprises a N×N sub-array comprising N columns of the primary processing elements and N rows of the primary processing elements,
  the activations matrix comprises a N×N matrix comprising N columns of the activations and N rows of the activations,
  the weights kernel comprises a M×M weights kernel comprising M columns of weights and M rows of the weights, and
  the computing of the convolution is completed in Y clock cycles, where Y is equal to $M^2$.

9. The processing unit of claim 8, further comprising a memory accessible by the controller and storing the activations matrix and the weights kernel.

10. The processing unit of claim 8, wherein:

each of the primary processing elements and the secondary processing elements further comprises a multiplexor;
  during any given clock cycle, the multiplexor in one of the processing elements in the array of processing elements receives accumulated partial product inputs from adjacent processing elements adjacent to the one of the processing elements in the array of processing elements and multiplexors in the processing elements of the array of processing elements receive a same specific control signal from the controller; and
the specific control signal causes the multiplexor in each of the processing elements in the array of processing elements to select one accumulated partial product input, from one of the adjacent processing elements adjacent to the processing element of that multiplexor, for processing such that the spiral pattern is followed.

11. The processing unit of claim 10, wherein:

the multiply-accumulate unit within each of the primary processing elements comprises a multiplier and an accumulator and, within a given clock cycle, the multiplier determines a product of the corresponding activation value and the specific weight value and the accumulator determines a sum of the product and the accumulated partial product input selected by that primary processing element and outputs the sum to each of the processing elements adjacent to that primary processing element as an accumulated partial product input available for selection during a next clock cycle; and the buffer within each of the secondary processing elements buffers the selected accumulated partial product input and subsequently outputs the buffered accumulated partial product to each of the processing elements in the array of processing elements adjacent to that secondary processing element as an accumulated partial product input available for selection during a next clock cycle.

12. The processing unit of claim 11, wherein:
the processing elements in the array of processing elements adjacent to each of the primary processing elements comprise a left-side adjacent processing element, a top-side adjacent processing element, a right-side adjacent processing element and a bottom-side processing element; and
the controller outputs a first control signal to cause selection of a first accumulated partial product input from one of the left-side adjacent processing elements when moving right to select the next weight, a second control signal to cause selection of a second accumulated partial product input from a corresponding one of the top-side adjacent processing elements when moving down to select the next weight, a third control signal to cause selection of a third accumulated partial product input from a corresponding one of the right-side adjacent processing elements when moving left to select the next weight and a fourth control signal to cause selection of a fourth accumulated partial product input from a corresponding one of the bottom-side adjacent processing elements when moving up to select the next weight.

13. The processing unit of claim 8, wherein the spiral pattern begins with a first weight at a top left corner of the weights kernel and ends with a last weight at a center of the weights kernel.

14. A processing method comprising:
for computing a convolution, pre-loading, by a controller of a processing unit, activation values from an activations matrix into primary processing elements in an array of processing elements within the processing unit, the array of processing elements comprising i) a sub-array of the primary processing elements and ii) secondary processing elements bordering the sub-array, and the pre-loading being performed such that each of the primary processing elements stores a corresponding activation value;
during an initial clock cycle, selecting, by the controller, a specific weight value from a weights kernel and loading the specific weight value into all of the primary processing elements so that each of the primary processing elements performs a multiply-accumulate operation using the corresponding activation value and the specific weight value; and
during each successive clock cycle, selecting, by the controller, a next weight value from the weights kernel, wherein
the selecting is performed by following a spiral pattern,
the sub-array comprises a N×N sub-array comprising N columns of the primary processing elements and N rows of the primary processing elements,
the activations matrix comprises a N×N matrix comprising N columns of the activations and N rows of the activations,
the weights kernel comprises a M×M weights kernel comprising M columns of weights and M rows of the weights, and
the computing of the convolution is completed in Y clock cycles, where Y is equal to $M^2$.

15. The method of claim 14, wherein the spiral pattern begins with a first weight at a top left corner of the weights kernel and ends with a last weight at a center of the weights kernel.

16. The method of claim 14, further comprising, during each successive clock cycle:
controlling accumulated partial product input selections within the processing elements in the array of processing elements across the array of processing elements such that within each of the processing elements in the array of processing elements one of multiple accumulated partial product inputs received from multiple adjacent processing elements, respectively, is selected according to the spiral pattern,
wherein
within each of the primary processing elements, the accumulated partial product input selected by that primary processing element is used during the multiply-accumulate operation,
the multiply-accumulate operation comprises
determining a product of the corresponding activation value and the specific weight value, and
determining a sum of the product and the accumulated partial product input selected by that primary processing element, the sum being output to each adjacent processing element in the array of processing elements as an accumulated partial product input available for selection during a next clock cycle, and
within each of the secondary processing elements, the accumulated partial product input selected by that primary processing element is buffered and the buffered accumulated partial product is output to each of the processing elements in the array of processing elements adjacent to that secondary processing element as an accumulated partial product input available for selection during a next clock cycle.

17. The method of claim 16, wherein:
each of the primary processing elements has a left-side adjacent processing element, a top-side adjacent processing element, a right-side adjacent processing element and a bottom-side processing element; and
the controlling comprises outputting a first control signal to cause selection of a first accumulated partial product input from one of the left-side adjacent processing elements when moving right to select the next weight, outputting a second control signal to cause selection of a second accumulated partial product input from a corresponding one of the top-side adjacent processing elements when moving down to select the next weight, outputting a third control signal to cause selection of a third accumulated partial product input from a corresponding one of the right-side adjacent processing elements when moving left to select the next weight, and outputting a fourth control signal to cause selection of a fourth accumulated partial product input from a corresponding one of the bottom-side adjacent processing elements when moving up to select the next weight.

* * * * *